United States Patent
Bischoff et al.

(10) Patent No.: US 7,989,731 B2
(45) Date of Patent: Aug. 2, 2011

(54) METHOD FOR PROCESSING MATERIALS WITH LASER PULSES HAVING A LARGE SPECTRAL BANDWIDTH

(75) Inventors: Mark Bischoff, Jena (DE); Martin Hacker, Jena (DE); Roland Sauerbrey, Jena (DE); Gregor Stobrawa, Jena (DE); Wolfgang Ziegler, Jena (DE)

(73) Assignee: Carl Zeiss Meditec AG, Jena (DE)

( * ) Notice: Subject to any disclaimer, the term of this patent is extended or adjusted under 35 U.S.C. 154(b) by 1286 days.

(21) Appl. No.: 10/565,582

(22) PCT Filed: Jul. 20, 2004

(86) PCT No.: PCT/EP2004/008090
§ 371 (c)(1),
(2), (4) Date: Jul. 10, 2006

(87) PCT Pub. No.: WO2005/009666
PCT Pub. Date: Feb. 3, 2005

(65) Prior Publication Data
US 2007/0034616 A1   Feb. 15, 2007

(30) Foreign Application Priority Data
Jul. 22, 2003  (DE) .................................. 103 33 770

(51) Int. Cl.
*B23K 26/06*   (2006.01)
(52) U.S. Cl. .......... 219/121.85; 219/121.62; 219/121.73
(58) Field of Classification Search ............. 219/121.83, 219/121.85, 121.62, 121.73, 121.76, 121.77; 606/3, 4, 5, 17; 264/400, 482
See application file for complete search history.

(56) References Cited

U.S. PATENT DOCUMENTS

| | | | |
|---|---|---|---|
| 4,399,345 A | 8/1983 | Lapham et al. | |
| 4,494,226 A | 1/1985 | Hazel et al. | |
| 4,655,547 A | 4/1987 | Heritage et al. | |
| 4,707,584 A * | 11/1987 | Kimbara | 219/121.67 |

(Continued)

FOREIGN PATENT DOCUMENTS
DE     39 26 859 C2     7/1990

(Continued)

OTHER PUBLICATIONS

Stoian et al.,"Dynamic temporal pulse shaping in advanced ultrafast laser material processing", May 2003, Applied Physics A 77, pp. 265-269.*

(Continued)

*Primary Examiner* — Geoffrey S Evans
(74) *Attorney, Agent, or Firm* — Patterson Thuente Christensen Pedersen P.A.

(57) ABSTRACT

A method and device for processing materials with laser pulses having a large spectral bandwidth and a device for carrying out said method. The aim of the invention is to create an easy, flexible method enabling universally applicable processing which can, however, be adapted to specific processing and methodological requirements. According to the invention, one or several spectral parameters of the laser pulses, i.e. the spectral amplitude and/or spectral phase and/or spectral polarization thereof, is/are specifically modified, preferably according to a measuring process variable, in order to process material or during the occurrence of said processing. The invention is used in order to process material with laser pulses having a large spectral bandwidth, particularly femto-second pulses and pico-second pulses.

23 Claims, 1 Drawing Sheet

U.S. PATENT DOCUMENTS

| | | | |
|---|---|---|---|
| 4,920,541 A * | 4/1990 | Baumgartner et al. | 372/23 |
| 5,260,728 A * | 11/1993 | Yoshioka et al. | 353/34 |
| 5,286,947 A | 2/1994 | Clyde et al. | |
| 5,350,374 A | 9/1994 | Smith | |
| 5,373,135 A | 12/1994 | Beyer et al. | |
| 5,528,612 A * | 6/1996 | Scheps et al. | 372/23 |
| 5,569,398 A | 10/1996 | Sun et al. | |
| 5,656,186 A | 8/1997 | Mourou et al. | |
| 5,720,894 A | 2/1998 | Neev et al. | |
| 5,948,214 A | 9/1999 | Bailey | |
| 5,984,916 A | 11/1999 | Lai | |
| 5,995,523 A * | 11/1999 | Xie | 372/22 |
| 6,150,630 A | 11/2000 | Perry et al. | |
| 6,195,164 B1 * | 2/2001 | Thompson et al. | 219/121.6 |
| 6,259,560 B1 * | 7/2001 | Scheps | 359/485.06 |
| 6,268,586 B1 * | 7/2001 | Stuart et al. | 219/121.72 |
| 6,281,471 B1 | 8/2001 | Smart | |
| 6,326,589 B1 | 12/2001 | Beersiek et al. | |
| 6,329,270 B1 | 12/2001 | Voutsas | |
| 6,482,199 B1 * | 11/2002 | Neev | 606/10 |
| 6,532,068 B2 * | 3/2003 | Detalle et al. | 356/318 |
| 6,616,275 B1 | 9/2003 | Dick et al. | |
| 6,787,733 B2 | 9/2004 | Lubatschowski et al. | |
| 7,359,045 B2 * | 4/2008 | Some | 356/237.5 |
| 2002/0021723 A1 * | 2/2002 | Amako et al. | 372/23 |
| 2002/0176151 A1 * | 11/2002 | Moon et al. | 359/298 |
| 2003/0052102 A1 * | 3/2003 | Amako et al. | 219/121.75 |
| 2003/0149425 A1 * | 8/2003 | Takada et al. | 606/4 |
| 2004/0017560 A1 * | 1/2004 | Liu | 356/213 |
| 2004/0102767 A1 | 5/2004 | Stingl et al. | |
| 2005/0107708 A1 | 5/2005 | Wrobel et al. | |

FOREIGN PATENT DOCUMENTS

| | | |
|---|---|---|
| DE | 41 24 162 C1 | 12/1992 |
| DE | 197 41 329 C1 | 10/1998 |
| DE | 100 07 391 A1 | 5/2001 |
| DE | 100 06 081 A1 | 8/2001 |
| DE | 100 20 559 A1 | 10/2001 |
| DE | 102 03 198 A1 | 7/2003 |
| JP | 2-118621 A * | 5/1990 |
| JP | 5-104276 A * | 4/1993 |
| JP | 2001-170788 A * | 6/2001 |
| WO | WO 01/12113 A1 | 2/2001 |
| WO | WO 02/28305 A1 | 4/2002 |
| WO | WO 03/057023 A1 | 7/2003 |

OTHER PUBLICATIONS

Bardeen et al., "Effects of Pulse Shaping on the Efficiency of multiphoton processes: Implications for Biology Microscopy", Jul. 1999, Journal of Biomedical Optics, vol. 4, No. 3, pp. 362-367.*

Stoian et al., "Adaptive Optimization in ultrafast laser material processing", Oct. 2004, Proceedings of SPIE, vol. 5448, pp. 73-83.*

Webster(ed.), Wiley Encyclopedia of Electrical and Electronics Engineering, Dec. 1999, John Wiley& Sons, pp. 234-246.*

Korte, et al., "Sub-diffraction limited structuring of solid targets with femtosecond laser pulses," *Optics Express*, vol. 7, No. 2, pp. 41-49 (Jul. 17, 2000).

Brixner, et al., "Femtosecond polarization pulse shaping," *Optics Letters*, vol. 26, No. 8, pp. 557-559 (Apr. 15, 2001).

Stoian, et al., "Laser ablation of dielectrics with temporally shaped femtosecond pulses," *Appl. Phys. Lett.*, vol. 80, No. 3, pp. 353-355 (Jan. 21, 2002).

Stoian, et al., "Ultrafast laser material processing using dynamic temporal pulse shaping," *RIKEN Review No. 50*, pp. 71-76 (Jan. 2003).

Hacker, et al., "Micromirror SLM for femtosecond pulse shaping in the ultraviolet," *Appl. Phys. B*, vol. 76, pp. 711-714 (Jun. 2003).

* cited by examiner

METHOD FOR PROCESSING MATERIALS WITH LASER PULSES HAVING A LARGE SPECTRAL BANDWIDTH

FIELD OF THE INVENTION

The invention relates to a method of material processing with laser pulses having a large spectral bandwidth, in particular with femtosecond and picosecond pulses, as well as to an apparatus for carrying out said method.

BACKGROUND OF THE INVENTION

A multiplicity of methods are known which utilize the interaction of electromagnetic radiation in the infrared, visible and ultraviolet spectral ranges with matter to melt, evaporate, remove (ablate) material (U.S. Pat. No. 4,494,226), to induce phase transitions (U.S. Pat. No. 6,329,270) or to modify other physical or chemical material properties.

If the field of interaction between laser light and a workpiece is spatially shaped on the surface of the workpiece, e.g. by optical masks or by successive shifting of the laser focus, it is possible to successfully generate line- and area-type structures during processing; and three-dimensional structures can be achieved by layered removal as well as, in transparent media, by positioning the laser focus in the depth of the material (DE 100 06 081 A1).

Many of these methods require high power densities, which can be achieved in particular by application of pulsed laser radiation sources. By using laser pulses of short duration (a few nanoseconds), particularly efficient processing is achieved (U.S. Pat. No. 6,281,471). Interfering modifications of the workpiece outside the zone of interaction, which are caused by thermal effects, can be further reduced through an even shorter pulse duration (U.S. Pat. No. 6,150,630). It is thus possible, e.g. by means of ablation, to generate very fine structures, wherein the size of the material areas in which an interaction with the radiation occurs and those which experience no substantial modification as compared to their initial condition is given only by the size of the laser focus. The theoretical limit for the minimal structural dimensions is then given by the diffraction limit and, thus, ultimately by the wavelength of the laser radiation used. In particular, the use of laser pulses with pulse durations ranging from approximately 20 fs to 1,000 ps enables direct micro-processing of material (F. Korte et. al.: "Sub-diffraction limited structuring of solid targets with femtosecond laser pulses", Optics Express 7, 2000, 41), which includes, in addition to technical uses, also medical uses, in particular in microsurgery. Moreover, apparatuses for generating spectrally broad-band laser pulses are widely applied as ultrashort-pulse lasers in research.

Two experimental papers by Stoian et al. (R. Stoian et al.:"Laser ablation of dielectrics with temporally shaped femtosecond pulses", Appl. Phys. Lett. 80, 2002, 353; R. Stoian et al.: "Ultrafast laser material processing using dynamic temporal pulse shaping", RIKEN Review 50,2003) disclose how the structuring process in laser ablation can be optimized as regards reducing residual damage by means of temporal shaped laser pulses. For this purpose, different pulse trains were generated by means of phase modulation, and the advantages of their use as compared to unshaped laser pulses of the laser system used in ablative laser boring of selected materials were experimentally shown under vacuum conditions. In doing so, unshaped and shaped laser pulses were respectively directed onto the surface of a-$SiO_2$ and $Al_2O_3$ for comparison and the result of processing was then visually analyzed with the help of a light microscope.

In laser material processing of composite materials, it is possible to select the amplitude spectrum of the laser pulses used such that material-selective processing is possible. The selection of a suitable laser under the aspect of adapting the laser wavelength to the material to be processed is a known method (e.g. U.S. Pat. Nos. 5,948,214, 5,948,214, 4,399,345, and 5,569,398). However, the physical-technical properties of the object to be processed may change during the processing operation, e.g. by material heating. In particular, changes of the absorption characteristic of composites limit material selectivity in the processing operation (U.S. Pat. No. 6,281, 471), because an adequate change of the laser wavelength is hardly possible with the lasers used for material processing.

Therefore, a method had to be provided making processing effects possible with as little effort as possible and in a manner as flexible and as universally applicable as possible, said effects respectively being specifically determinable and adaptable with regard to the processing task and the course of the process.

SUMMARY OF THE INVENTION

According to the invention, one or more spectral parameters of the laser pulses, i. e. the spectral amplitude and/or the spectral phase and/or the spectral polarization, are selectively changed for or during the material processing process, respectively, in order to cause defined processing-specific effects thereby, e.g. an increase in the processing speed, an improvement in material selectivity or an improvement in surface structuring. It is advantageous, if at least one spectral parameter is modified as a function of a parameter of measurement from the processing process, preferably in a closed-loop control circuit. More detailed specifications are given in this respect in the subclaims.

In this manner, it is possible, on the one hand, to effect the best possible setting of the spectral laser pulse parameters (for example, on the basis of test results or other experiences or calculations) for the intended processing operation and the intended effect of said material processing. Moreover, on the other hand, said spectral laser pulse parameters can not only be pre-selected in a defined manner, but can also be modified and adapted for the material processing process and/or during its execution as a function of a control variable obtained directly from the processing operation with regard to the intended processing effect. Insofar, the modification of physical-technical properties of the object to be processed and the process conditions during the processing operation can be responded to so as to improve or at least not to affect the intended processing effect. For example in the case of material heating, which generally does not leave material selectivity unaffected in the processing of composite materials, the spectral amplitude of the laser pulses as a function of the interaction of the laser pulses with the composite materials can be dynamically modified as a measurable quantity. These modifications can be effected both continuously or in intervals directly during the processing operation (closed-loop control operation) and with interruption of the processing operation and re-adjustment of the spectral parameters for continuation of said operation.

Our own investigations as to micro-structuring of optically anisotropic materials show that selective modification of the frequency components of a spectrally broad-band laser pulse allows control of the process of interaction between the laser pulse and the object to be processed. In particular, the simultaneous closed-loop control of spectral polarization and of spectral phase in processing anisotropic materials enables control of that structuring process which is utilized to generate anisotropic wave guide structures, especially because known experimental results (F. Korte et. al.: "Sub-diffraction limited structuring of solid targets with femtosecond laser pulses", Optics Express 7, 2000, 41) show that even in laser processing of optically isotropic materials not only a local change in refractive index is effected, but local anisotropy is usually induced as well.

Possibilities of modifying the spectral parameters of spectrally broad-band laser pulses per se are well known (U.S. Pat. No. 4,655,547 or Brixner and Gerber: Optics Letters 26, 2001, 557). In particular, modulators on the basis of microelectromechanic systems (MEMS) appear to have great potential for future industrial application (Hacker et al.: "Micromirror SLM for femtosecond pulse shaping in the ultraviolet", Appl. Phys. B 76, 2003, 711).

BRIEF DESCRIPTION OF THE DRAWINGS

The invention shall be explained in more detail below with reference to embodiments depicted in the drawings.

FIG. 1 schematically shows a design of an apparatus for material processing with shaping of the spectral laser pulse parameters. A short-pulse laser 1 as a source of broadband laser pulses 1 is connected via a pulse shaper 2 for shaping the spectral parameters of the laser pulses to a processing unit 3 for material processing of an object to be processed, which is not shown. The pulses of the short-pulse lasers 1 are thus shaped as regards their spectral amplitude and/or the spectral phase and/or the spectral polarization and cause, in the processing unit 3, a physical-technical interaction with the material when impinging on the object to be processed. The shaped laser pulses (as shown in broken lines) may optionally also be supplied to the processing unit 3 via an optical amplifier 4.

Figure 1:
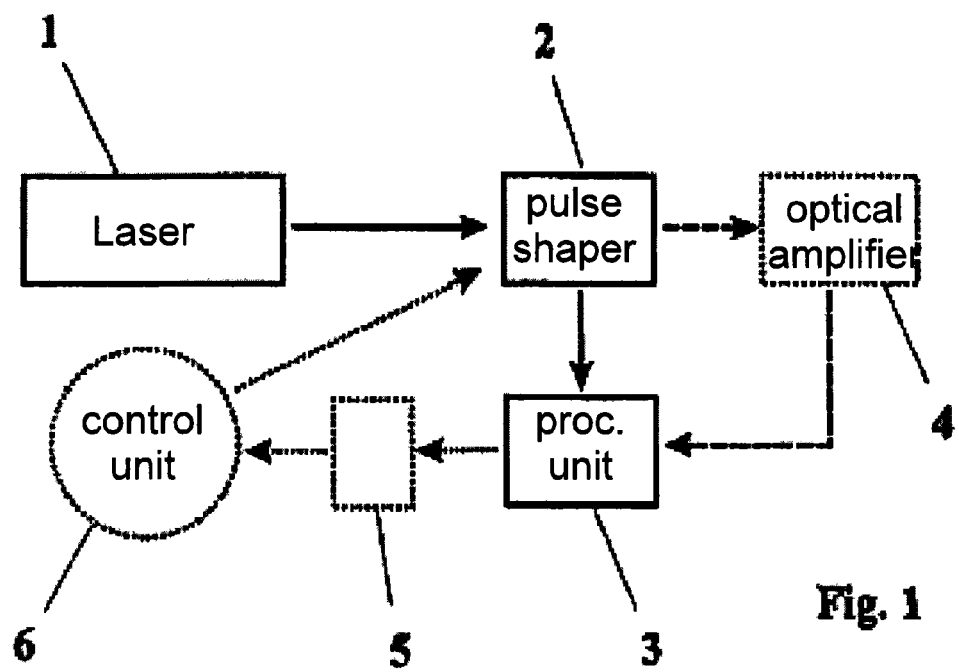
FIG. 1 schematically shows a design of an apparatus for material processing with shaping of the spectral laser pulse parameters, and FIG. 2 schematically shows a design of an apparatus for laser-based interruption of electrically conductive paths on a microchip with modification of the spectral amplitude of the laser pulses.

Through modification of one or more of the spectral parameters of the laser pulses by the pulse shaper 2, the interaction of the laser pulses with the material of the object to be processed can be influenced in order to achieve defined processing-specific effects, e.g. with regard to processing speed, material selectivity or surface structuring, for or during the processing process.

It is thus advantageous if the modification of spectral parameters is changed as a function of a measurable quantity of material processing, which serves as a control variable. For this purpose, a measurement unit 5 is preferably coupled to the processing unit 3 including the object to be processed, which measurement unit 5 is connected to the impulse shaper 2 via a control unit 6. For example, the measurement unit 5 measures the ablation rate, the surface roughness or the material or environmental temperature, respectively, of the object to be processed and supplies a control variable via the control unit 6 as a function of the measurable quantity for modifying the spectral amplitude and/or the spectral phase and/or the spectral polarization of the pulses of the short-pulse laser 1.

Figure 2:
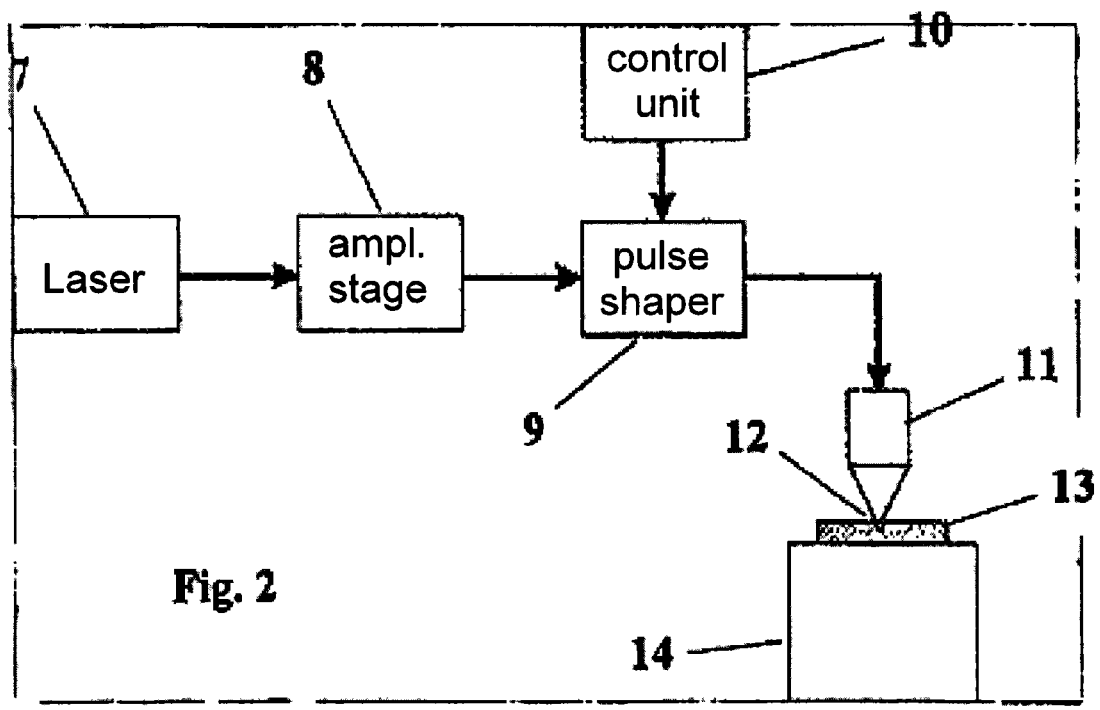

FIG. 2 schematically shows a design of a special apparatus for laser-based interruption of electrically conductive paths on a microchip (link blow). Such a material processing task is present, in particular, in conditioning memory chips. The method according to the invention can be advantageously employed to utilize the achieved material selectivity in order to avoid damage to the substrate of the microchip, which damage is otherwise caused by inaccuracy of spatial superposition of the laser light on the conductive paths to be processed (cf. also U.S. Pat. No. 6,281,471). Since a change in the temperature of the object to be processed also occurs during material processing, by which change the absorption spectra of the individual material components are shifted, the effect of the method according to the invention is particularly advantageous, because otherwise there would be an impairment of material selectivity by the shift of said absorption spectra of the composite materials. This could also result in processing errors and damage to the object to be processed.

The apparatus contains a femtosecond laser 7, which is connected to an amplitude-modulating pulse shaper 9 via a laser amplification stage 8, the control input of said pulse shaper 9 being connected for amplitude modification to the output of a control unit 10. The laser pulses of the femtosecond laser 7 pass to an achromatic objective 11 after amplification and after modulation of their spectral amplitude, which objective guides the laser beam to a zone 12 of interaction with an object 13 to be processed. The object 13 to be processed is arranged on a coordinate stage 14 which allows positioning of the object 13 to be processed in three spatial directions. For example, the amplitude-modifying pulse shaper 9 can be realized by an optical arrangement according to U.S. Pat. No. 4,655,547 which includes a spatial separation of the spectral components of the laser beam by means of a diffraction grating and subsequent imaging of the spectrum into a Fourier plane by means of a lens. A polarization-rotating, strip-shaped liquid crystal matrix (twisted nematic liquid crystal matrix) arranged in said Fourier plane serves as a spatial light modulator and causes modification of the polarization condition of the spectral components traversing the individual strips. In said patent document, a subsequent polarizer (analyzer) serves to transfer the thus achieved modification of the polarization condition of the individual spectral components into the desired spectral amplitude modulation. A further lens and a further dispersive element having the same parameters as the corresponding input components cause a transformation of the spatially separated spectrum back into the laser beam (collimation).

Suitable selection of the parameters for pulse shaping allows material selectivity to be achieved by adapting the spectral amplitude of the laser pulses to the absorption spectrum of the material component to be processed so as not to damage adjacent zones of other material during laser processing. Moreover, temperature changes can be reacted to, which changes result from the material processing and shift the absorption spectra of the composite materials. In this case (cf. FIG. 1), a measurement sensor (not shown in FIG. 2 for a better overview) for sensing the temperature could be arranged on the object 13 to be processed, said sensor being connected to the control unit 10. Using a temperature-dependent control during laser material processing in this case the pulse shaper would allow dynamic adaptation of the spectral amplitude of the laser pulses to the absorption characteristic of the material to be ablated, so that temperature changes in the processing process would not affect material selectivity.

The practice of the invention is not restricted to the embodiments given herein, and improvements made by a skilled person are not outside the scope of protection as defined by the claims.

The invention claimed is:

1. A method of processing material of an object comprising generating laser radiation delivered as laser pulses having a large spectral bandwidth, and irradiating the material with the laser pulses to process the material by causing a processing effect that creates a physical or chemical change in the material, the method further comprising:
  determining a spectral dependency of the processing effect before or during the processing; and
  altering the generated laser radiation before or during processing to achieve defined processing effects by selectively modifying a spectral parameter of the laser radiation according to the spectral dependency of the processing effect,
  wherein the modified spectral parameter is a spectral distribution of polarization in the laser pulses.

2. The method of claim 1, wherein one of the following defined processing effects are evaluated when considering the spectral dependency:
  an increase in processing speed, an improvement in material selectivity, an improvement in surface structuring, an achievement of an optical breakthrough, and any combination thereof.

3. The method of claim 1, wherein determining the spectral dependency comprises testing the spectral parameter of the laser pulses for its processing effect and selecting values for the tested spectral parameter as start values for the material processing.

4. The method of claim 1 wherein determining the spectral dependency comprises selecting values for the spectral parameter from test results or pre-stored data as start values for the processing.

5. The method of claim 1, wherein the laser pulses are altered by spatially separating spectral components of the laser radiation, modifying different spectral components differently and collimating the spectral components back into a pulsed laser beam, wherein the modification of the different spectral components relates to the spectral dependency of the processing effect.

6. The method of claim 1, further comprising measuring a quantity of the processing effect and dynamically modifying the spectral parameter as a function of the measured quantity.

7. The method of claim 6, wherein a surface roughness serves as the measurable quantity.

8. The method of claim 6, further comprising using a transmission of the object to be processed as the measurable quantity producing or processing an optical wave guide.

9. The method of claim 6, further comprising using a reflection of electromagnetic waves as the measurable quantity for producing or processing an optical wave guide.

10. The method of claim 6, wherein a fraction of laser light reflected by a processing zone serves as the measurable quantity.

11. The method of claim 6, further comprising providing a component having resonance frequencies and using at least one of the resonance frequencies as the measurable quantity for producing or processing a micro-mechanical component.

12. The method of claim 6, wherein a resonance amplitude at a defined oscillation frequency serves as the measurable quantity for producing or processing a micro-mechanical component.

13. The method of claim 6, further comprising evaluating a hydrophobicity or a hydrophilicity of a processing surface as the measurable quantity.

14. The method of claim 6, further comprising evaluating an anisotropy of a processed material as the measurable quantity.

15. The method of claim 6, further comprising using a material selectivity of an interaction with composite materials as the measurable quantity in the processing of composite materials.

16. The method of claim 6, wherein a removal rate of material processing serves as the measurable quantity.

17. The method of claim 6, wherein, in two-photon polymerization of photosensitive materials, the measurable quantities are selected from the group consisting of: a quantum efficiency of the polymerization process, optical properties of the polymerized materials, mechanical properties of the polymerized material, and any combinations thereof.

18. The method of claim 6, further comprising using at least one electrical property of said microelectronic component as the measurable quantity in processing a microelectronic component.

19. The method of claim 18, further comprising selecting said electrical property from the group consisting of: conductivity and capacitance.

20. The method of claim 6, wherein the material is human eye tissue and further comprising measuring at least one plasma parameter as the measured quantity.

21. The method of claim 20, further comprising selecting the plasma parameter from the group consisting of: an energy threshold value for an optical breakthrough, a scattered light, a plasma spectrum, and any combinations thereof.

22. A method for processing material of an object comprising generating laser radiation delivered as laser pulses having a large spectral bandwidth and irradiating the material with the laser pulses to process the material by causing a processing effect involving a physical or chemical change in the material, the method further comprising:
  considering a spectral dependency of the processing effect before or during the processing; and
  altering the generated laser radiation before or during the processing to optimize the processing effect by selectively modifying, according to the spectral dependency of the processing effect, the spectral composition of the following parameter of the laser radiation: and spectral distribution of polarization in the laser pulses.

23. The method of claim 22, wherein the laser pulses are altered by spatially separating spectral components of the laser radiation, modifying different spectral components differently and collimating the spectral components back into a pulsed laser beam, wherein the modification of the different spectral components relates to the spectral dependency of the processing effect.

* * * * *